(12) United States Patent
Mizukami et al.

(10) Patent No.: US 6,183,864 B1
(45) Date of Patent: Feb. 6, 2001

(54) THERMOPLASTIC RESIN-COMBINED GLASS FIBER BASE MATERIAL AND PROCESS FOR ITS PRODUCTION

(75) Inventors: Toru Mizukami; Kengo Ozaki, both of Tokyo (JP)

(73) Assignee: Asahi Fiber Glass Company, Limited, Tokyo (JP)

( * ) Notice: Under 35 U.S.C. 154(b), the term of this patent shall be extended for 0 days.

(21) Appl. No.: 09/288,850

(22) Filed: Apr. 9, 1999

(30) Foreign Application Priority Data

Apr. 15, 1998 (JP) .................................................. 10-104626
Feb. 19, 1999 (JP) .................................................. 11-041497

(51) Int. Cl.$^7$ .................................. B32B 9/00; B05D 1/18
(52) U.S. Cl. ............................ 428/392; 428/375; 428/378
(58) Field of Search ..................................... 428/375, 378, 428/392; 427/434.4, 434.5, 434.6

(56) References Cited

U.S. PATENT DOCUMENTS

| | | | |
|---|---|---|---|
| 3,993,726 | * 11/1976 | Moyer | 264/174 |
| 4,680,224 | * 7/1987 | O'Connor | 428/294 |
| 4,741,151 | * 5/1988 | Klink et al. | 57/350 |
| 4,802,331 | * 2/1989 | Klink et al. | 57/246 |
| 4,983,453 | * 1/1991 | Beall | 428/294 |
| 4,992,229 | * 2/1991 | Beever | 264/280 |
| 5,026,410 | * 6/1991 | Pollet et al. | 65/3.43 |
| 5,084,305 | 1/1992 | Marttila . | |
| 5,409,757 | 4/1995 | Muzzy et al. . | |
| 6,045,876 | * 4/2000 | Fellers et al. | 427/434.4 |

FOREIGN PATENT DOCUMENTS

| | | |
|---|---|---|
| 0 712 716 | 5/1996 | (EP) . |
| 3-119034 | 5/1991 | (JP) . |
| 4-222243 | 8/1992 | (JP) . |
| 6-23742 | 2/1994 | (JP) . |
| 6-114830 | 4/1994 | (JP) . |

OTHER PUBLICATIONS

Patent Abstracts of Japan, vol. 015, No. 317 (C–0858), Aug. 13, 1991, JP 03 119034, May 21, 1991.

* cited by examiner

*Primary Examiner*—William Krynski
*Assistant Examiner*—J. M. Gray
(74) *Attorney, Agent, or Firm*—Oblon, Spivak, McClelland, Maier & Neustadt, P.C.

(57) ABSTRACT

A thermoplastic resin-combined glass fiber base material, which comprises a glass fiber strand having a plurality of glass monofilaments bundled and a thermoplastic resin impregnated thereto, and which:

A) has a string form with an average diameter of from 0.2 to 1.5 mm,

B) has a glass content of from 15 to 80 vol %,

C) has an impregnation rate of the thermoplastic resin of at least 95%, and

D) satisfies $R \leq 30D \times V$, where R is the radius of curvature (mm) representing the buckling limit in bending, D is the average diameter (mm), and V is the glass content (vol %/100).

7 Claims, 3 Drawing Sheets

THERMOPLASTIC RESIN-COMBINED GLASS FIBER BASE MATERIAL AND PROCESS FOR ITS PRODUCTION

The present invention relates to a thermoplastic resin-combined glass fiber base material which has good productivity and mechanical strength and is excellent in flexibility, and a process for its production.

As a molding material for a fiber reinforced thermoplastic resin (hereinafter referred to as FRTP), a prepreg for molding having a powder or fibers of a thermoplastic resin combined with continuous glass fibers, has been known. However, such a prepreg for molding is usually designed to impregnate the resin to the glass fibers when the thermoplastic resin is melt-pressed in a subsequent step, and it is usually difficult to completely impregnate the resin to the glass fibers, whereby there have been problems such that the glass content tends to be non-uniform, voids are contained in a substantial amount, and the mechanical strength is poor.

On the other hand, as FRTP whereby impregnation is relatively good, a compound having a thermoplastic resin melt-impregnated to continuous glass fibers, is known as a long fiber compound (hereinafter referred to as LFC). In LFC, a resin is preliminarily impregnated to glass fibers, whereby the resin-impregnation property during the molding is good as compared with the above described prepreg.

Further, JP-A-3-119034 discloses a string-form compound wherein the number of reinforcing fiber monofilaments is limited to improve the flexibility of conventional LFC.

However, conventional LFC has not been required to have flexibility, since it has been used usually as cut into a predetermined length to be useful as a molding material for injection molding. Accordingly, even if it has been attempted to wind up such LFC without cutting to use it as a fiber base material for various molding materials, packaging has been difficult, since the rigidity is so high that winding up is difficult, or it is hardly bent or is easily be broken. Thus, it has been difficult to apply it as a filament winding molding material or a molding material for prepreg for woven fabric or cord fabric.

Whereas, the base material disclosed in JP-A-3-119034 has good flexibility, but the number of reinforcing fiber monofilaments (the number of filaments in strand) is reduced, whereby the operation during the production tends to be cumbersome and the productivity tends to be poor, and the resulting material tends to be poor in the mechanical strength.

Namely, in a case where a glass fiber strand having a small number of filaments in strand, is to be produced, it is necessary to divide many monofilaments from one bushing into a large number of packages, whereby the operation tends to be cumbersome, and in the production of the base material, the number of filaments in strand is reduced to obtain one having a small content of reinforcing fibers, whereby the production efficiency per base material tends to be poor.

Further, the base material obtained by the above method has a small number of monofilaments and a small reinforcing effect, whereby the tensile breaking load tends to be small, and thus has had a problem that the breakage of the base material is likely to result during filament winding or processing into a woven fabric.

Under these circumstances, it is an object of the present invention to provide a thermoplastic resin-combined glass fiber base material which is useful as a filament winding molding material, a molding material for prepreg of a woven fabric or cord fabric, or LFC for injection molding, obtained by cutting such a molding material and which has good productivity and mechanical strength and is excellent in flexibility, and a process for its production.

To accomplish the above object, the present invention provides a thermoplastic resin-combined glass fiber base material, which comprises a glass fiber strand having a plurality of glass monofilaments bundled and a thermoplastic resin impregnated thereto, and which:

A) has a string form with an average diameter of from 0.2 to 1.5 mm,

B) has a glass content of from 15 to 80 vol %,

C) has an impregnation rate of the thermoplastic resin of at least 95%, and

D) satisfies $R \leq 30D \times V$, where R is the radius of curvature (mm) representing the buckling limit in bending, D is the average diameter (mm), and V is the glass content (vol %/100).

Further, the present invention provides a process for producing a thermoplastic resin-combined glass fiber base material, which comprises impregnating a thermoplastic resin by a melt impregnation method to a glass fiber strand obtained by bundling a plurality of glass monofilaments without applying splitting thereto, followed by pultrusion from a nozzle and winding up, to obtain a thermoplastic resin-combined glass fiber base material having the above mentioned characteristics A to D.

The thermoplastic resin-combined glass fiber base material of the present invention has the above mentioned characteristics A to D, and thus, it is excellent in flexibility and has good handling efficiency such as good winding up efficiency, and yet it has good productivity and mechanical strength. Accordingly, it is suitable for preparation of a filament winding molding material, a molding material for prepreg of a woven fabric or cord fabric, or a molding material useful as LFC for injection molding prepared by cutting such a molding material. Further, since the impregnation rate of a thermoplastic resin is high, the glass content in the molded product can easily be made uniform, and quick molding at a low pressure can be made possible.

Further, according to the process for producing a thermoplastic resin-combined glass fiber base material of the present invention, a thermoplastic resin is impregnated to a glass fiber strand obtained by bundling without application of splitting, followed by pultrusion from a nozzle and winding up, whereby clogging of the nozzle can be prevented, and continuous production can be made possible even when the glass content is increased, and it is possible to obtain a thermoplastic resin-combined glass fiber base material which has a high impregnation rate of the thermoplastic resin, is excellent in flexibility and has little fuzz on its periphery. Further, by adjusting the number of glass monofilaments bundled to form the above glass fiber strand to be from 200 to 2,000 filaments, the flexibility can be made particularly excellent, and the production efficiency will be particularly good.

In the accompanying drawings:

FIG. 1 is a view illustrating the testing method for the radius of curvature R.

FIGS. 2(a) and (b) are views illustrating the states in which a glass fiber strand is pultruded from a nozzle in a conventional process for producing a thermoplastic resin-combined glass fiber base material.

FIGS. 3(a) and (b) are schematic views illustrating the states in which a glass fiber strand enters into a nozzle in a conventional process for producing a thermoplastic resin-combined glass fiber base material.

Now, the present invention will be described in further detail with reference to the preferred embodiments.

The glass fiber strand to be used in the present invention is one having a plurality of glass monofilaments bundled. The average diameter of the glass monofilaments is preferably from 6 to 17 μm, and the number of filaments in the strand is usually from 200 to 4,000 filaments, preferably from 200 to 2,000 filaments, more preferably from 400 to 1,200 filaments. If the number of filaments is less than 200 filaments, it will be necessary to divide filaments from one bushing into a large number of packages to produce glass fiber strands having such a small number of filaments bundled, whereby the operation tends to be cumbersome, the production efficiency tends to be poor, and the cost tends to increase. Further, in the production of the base material, one having a small content of reinforcing fibers is to be prepared by reducing the number of glass monofilaments bundled, whereby the production efficiency per base material tends to be poor, such being undesirable. On the other hand, if the number of filaments in strand exceeds 2,000 filaments, the glass fiber strand tends to be thick, whereby impregnation of the thermoplastic resin among monofilaments tends to be difficult, and the resulting thermoplastic resin-combined glass fiber base material tends to be thick and thus tends to be poor in flexibility, such being undesirable.

The above glass fiber strand is preferably one obtained by bundling a plurality of glass monofilaments without applying splitting thereto, and it is further preferred to employ a single glass fiber strand.

Figure 4:
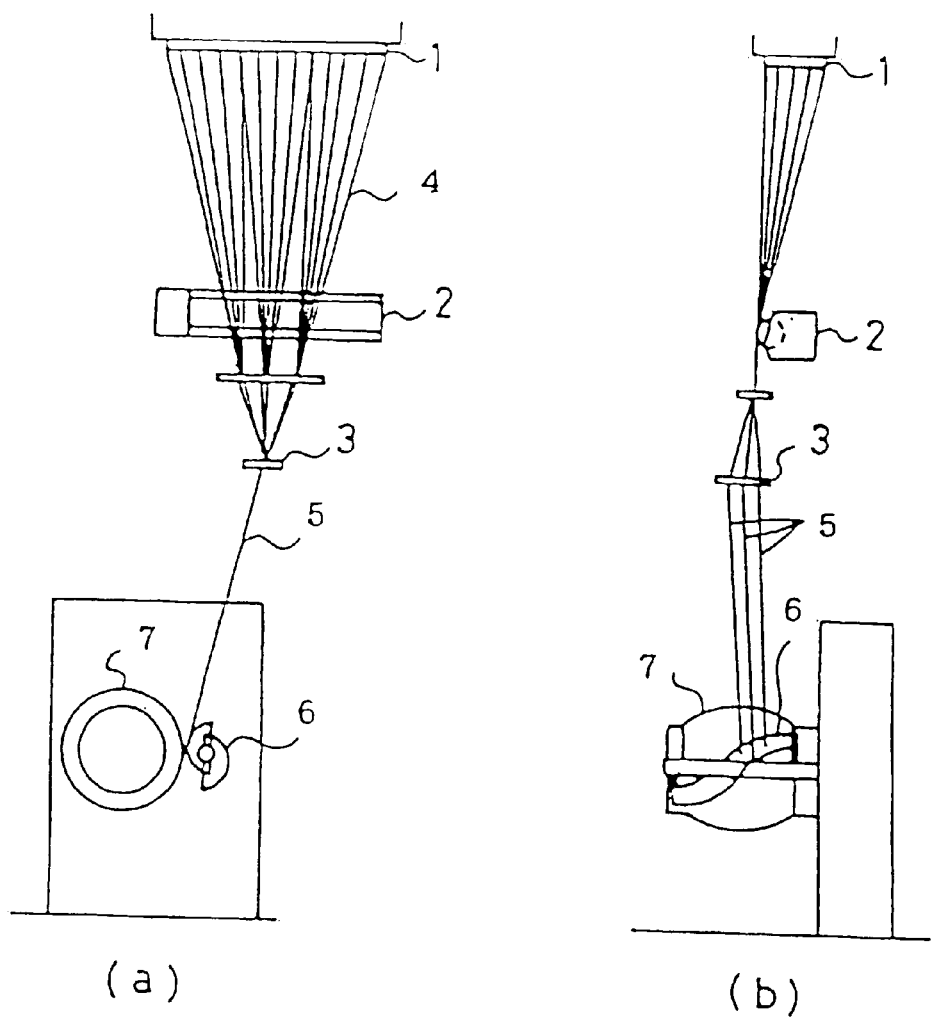
FIG. 4(a) is a front view illustrating an apparatus for producing a package (a cake) of a glass fiber strand subjected to splitting.
FIG. 4(b) is a side view of the same apparatus.

Here, splitting is meant for splitting whereby, as shown in FIG. 4, a number of monofilaments 4 spun from a bushing 1 are splitted by a splitter 3 into a plurality of glass fiber strands 5.

Figure 5:
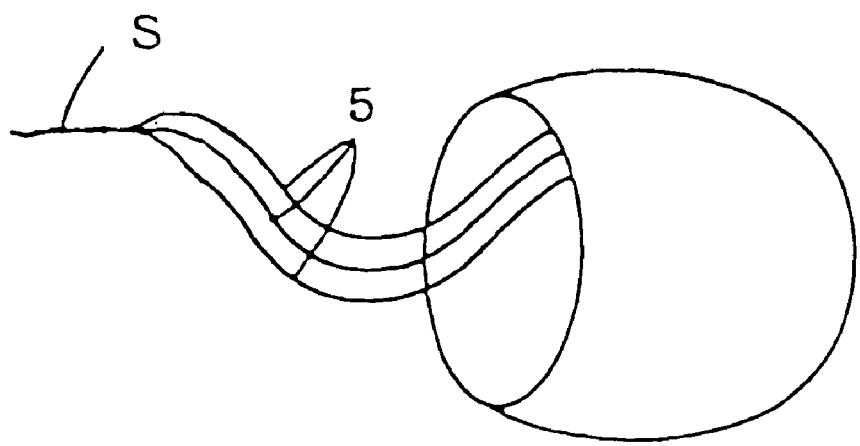
FIG. 5 is a view showing a bundle of glass fiber strands withdrawn from a package (a cake) of the glass fiber strands subjected to splitting.

One thus splitted and packaged, will be withdrawn as a bundle S of glass fiber strands, as shown in FIG. 5.

Figure 2:
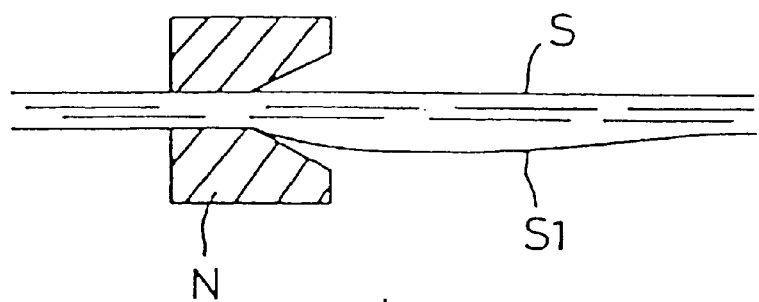
Figure 2:
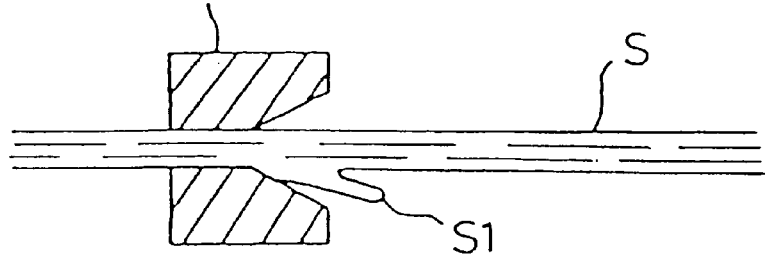

However, in a bundle S of a plurality of glass fiber strands, it is likely that as shown in FIG. 2(a), the lengths of the individual glass fiber strands tend to be non-uniform, and a partially elongated strand S1, may, for example, form. If such a bundle S of glass fiber strands is pultruded through a nozzle N, the elongated strand S1 will be squeezed by the nozzle N and is likely to form a loop, as shown in FIG. 2(b), whereby the glass content tends to be partially extremely high, and breakage of the filament is likely to take place, whereby pultrusion from the nozzle tends to be difficult. Such a phenomenon is remarkable especially when a bundle of glass fiber strands obtained by splitting as shown in FIG. 5, is used.

Figure 3:
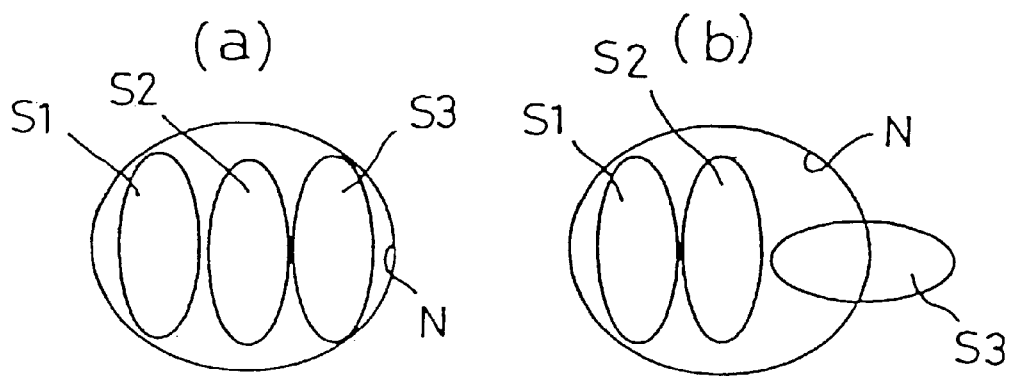
Figure 6:
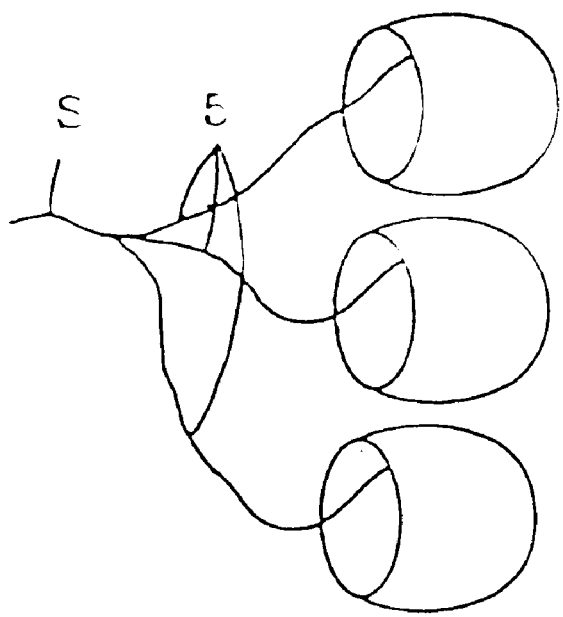
FIG. 6 is a view showing a bundle of glass fiber strands withdrawn from a plurality of packages.

Further, the glass fiber strands are likely to be flattened, and their cross sections tend to be oval or flattened, for example, during winding up into cakes. Accordingly, when a bundle S of glass fiber strands obtained by splitting, as shown in FIG. 5, or a bundle S of glass fiber strands withdrawn from a plurality of packages as shown in FIG. 6, is pultruded from a nozzle, it readily passes through the nozzle N if the respective glass fiber strands S1 to S3 are aligned in the flattened direction as shown in FIG. 3(a), but if one of the glass fiber strands becomes perpendicular to the direction as shown by S3 in FIG. 3(b), it bulges out of the nozzle N, whereby pultrusion tends to be difficult.

Accordingly, as the glass fiber strand to be used for the present invention, one having a plurality of glass monofilaments bundled, preferably one not subjected to splitting, more preferably a single glass fiber strand not subjected to splitting, is used. It is thereby possible to avoid the state shown in FIG. 2(b) due to irregularity in the lengths among the glass fiber strands or the state shown in FIG. 3(b) due to the relative positional relation among the glass fiber strands, so that no clogging will result during pultrusion from the nozzle, and the pultrusion from the nozzle will be facilitated. Accordingly, the glass content can be increased, and at the same time, the yield will be good, and the appearance will have little fuzz.

The thermoplastic resin to be used in the present invention is not particularly limited, and various resins which are commonly available in the market, can be used. For example, a polyolefin resin, a polyamide resin, a polyester resin, a polycarbonate resin, a polyphenylene sulfide resin or a polystyrene may, be employed. Among them, a polyolefin resin, a polyamide resin or a polyester resin is preferably used particularly from the viewpoint of the physical properties, the cost and the impregnation property to the glass fibers. Specifically, the polyolefin resin may, for example, be polypropylene or polyethylene. The polyamide resin may, for example, be nylon 6·6, nylon 6, nylon 12 or MXD nylon. Further, the polyester resin may, for example, be polyethylene terephthalate or polybutylene terephthalate. Further, to such a resin, additives such as a coloring agent, a modifier, an antioxidant and a weather-resisting agent, may be incorporated.

As a method for impregnating the thermoplastic resin to the above glass fiber strand, a method may be mentioned wherein the above glass fiber strand is sent to a resin impregnation tank, and the resin is impregnated by a melt impregnation method, followed by pultrusion from a nozzle and winding up. Particularly preferred is a method wherein a single glass fiber strand is pultruded from one nozzle and wound up. By pultruding a single glass fiber strand from a single nozzle, pultrusion from the nozzle will be easy as described above, the glass content can be increased, the yield can be increased, and the outer appearance may be made to have little fuzz.

The thermoplastic resin-combined glass fiber base material thus obtained usually has a string form. Here, the string form is meant for a continues linear product with its cross sectional shape being substantially not flat but a circular or oval shape. In such a case, the cross sectional shape is preferably such that long diameter/short diameter of the cross section=1 to 3.

Further, the average diameter of the thermoplastic resin-combined glass fiber base material is usually from 0.2 to 1.5 mm, preferably from 0.3 to 1.0 mm. If the average diameter is less than 0.2 mm, the number of monofilaments will be small to obtain one having a small content of reinforcing fibers, whereby the productivity per base material tends to be poor, and when a tension is exerted, for example, during the processing, breakage of the base material is likely to take place, such being undesirable. On the other hand, if it exceeds 1.5 mm, the flexibility tends to be poor, whereby the winding up tends to be difficult, and such will not be suitable for a filament winding molding material or for preparation of a molding material for prepreg of a woven fabric or cord fabric.

Here, the average diameter is the average of cross sectional diameters at five cross sections optionally selected from the thermoplastic resin-combined glass fiber base material, wherein each cross sectional diameter is the average of the long diameter and the short diameter of the cross section of the base material.

Further, the glass content is usually from 15 to 80 vol %, preferably from 25 to 70 vol %. If the glass content is less than 15 vol %, the reinforcing effect tends to be low, and if it exceeds 80 vol %, the production of the thermoplastic resin-combined glass fiber base material tends to be difficult, and even if it can be produced, the amount of the matrix surrounding the fibers tends to be too small, whereby it will be difficult to secure an impregnation rate of at least 95%.

Further, the impregnation rate of the thermoplastic resin-combined glass fiber base material is required to be at least 95%. If the impregnation rate is less than 95%, voids will form as defects, and the base material tends to bend during the processing, whereby the handling efficiency tends to be poor, and by this bending, breakage of the glass fibers is likely to result, whereby the strength of the resulting formed product tends to be low, and voids will remain as defects in the molded product, whereby no uniform mechanical properties can be obtained, such being undesirable.

Here, the impregnation rate is one determined by the following formula from the void area and the total cross sectional area as observed, when the cross section of the thermoplastic resin-combined glass fiber base material was observed by an electron microscope with 200 magnifications, and in a 20 $\mu$m mesh, if voids (air bubbles) are observed in the mesh even little, this mesh is added as a void area.

{(Total cross sectional area−void area)/total cross sectional area}×100 (%)

Further, the thermoplastic resin-combined glass fiber base material preferably satisfies $R \leq 30D \times V$, where R is the radius of curvature (mm) representing the buckling limit in bending, D is the average diameter (mm), and V is the glass content (vol %/100), and it more preferably satisfies $R \leq 30D \times V \times I^2$, where R is the radius of curvature (mm) representing the buckling limit in bending, D is the average diameter (mm), V is the glass content (vol %/100), and I is the impregnation rate (%/100). The smaller the radius of curvature R, the better the handling efficiency when made as a reinforcing fiber base material or a prepreg for molding. However, if it exceeds 30D×V, the rigidity tends to be high, whereby the flexibility tends to be poor, and it tends to be difficult to use it as a filament winding material, a reinforcing fiber base material or a prepreg for molding.

Figure 1:
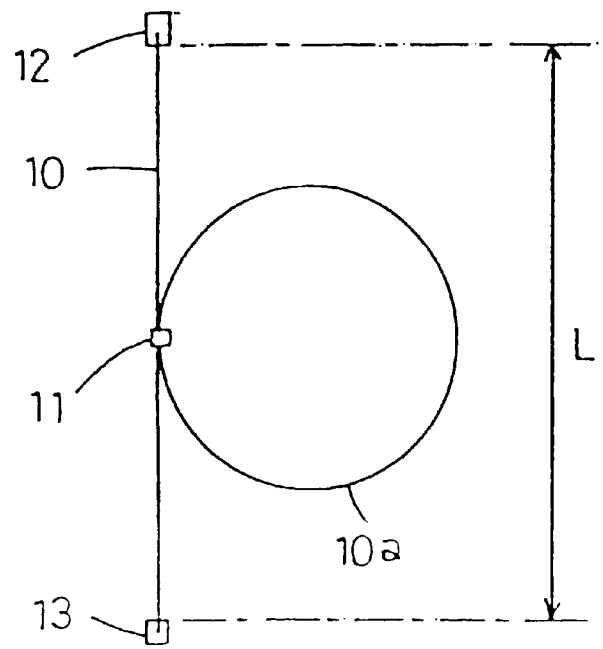

The radius of curvature R is a value measured by the method as shown in FIG. 1. Namely, firstly, a test piece (the thermoplastic resin-combined glass fiber base material) 10 having a total length of 600 mm and a collar 11 are prepared. Both ends of the test piece 10 were passed through the collar 11 to form a loop 10a, and the respective end portions of 50 mm are secured to chucks 12 and 13 of a tensile tester. Then, the chucks 12 and 13 are moved at a tensile rate of 10 mm/min, whereupon the length L between the chucks upon buckling, is measured. From this length L, the length of loop 10a is calculated, and the length of the loop 10a is divided by 2 $\pi$ to obtain R.

Now, the present invention will be described in further detail with reference to Examples. However, it should be understood that the present invention is by no means restricted to such specific Examples.

In each Example and Comparative Example, glass monofilaments having an average diameter of 13 $\mu$m were employed.

Further, the average diameter, the glass content, the impregnation rate, the radius of curvature, the tensile breaking load (susceptibility of the material to breakage), the number failed in pultrusion and the productivity of each obtained thermoplastic resin-combined glass fiber base material, were measured, and the results are shown in Table 1.

The average diameter, the impregnation rate and the radius of curvature were measured by the above described methods, and the glass content was obtained by firstly heating the obtained thermoplastic resin-combined glass fiber base material in an electric furnace of 600° C. to burn off the resin, then calculating the glass content (wt %) from the weight of the remaining glass, and converting this value to vol % on the basis such that the specific gravity of the resin is 0.91 and the specific gravity of the glass fibers is 2.54.

The tensile breaking load was measured in such a manner that the respective end portions of 30 mm of the material having a length of 220 mm were clamped by chucks of the tensile tester, and the chucks were moved at a tensile rate of 5 mm/min, and the load upon breakage was measured.

The number failed in pultrusion is the number of nozzles per hour, wherein clogging resulted and the base material broke and could not be pultruded (the number of nozzles per hour where the production was no longer possible), and the productivity is the productivity per hour, when 96 packages (cakes) were employed.

EXAMPLE 1

A single glass fiber strand (the number of filaments in strand: 600 filaments) which was not subjected to splitting, was introduced into an acid-modified molten polypropylene (260° C.) with MI (melt index)=40 and subjected to melt impregnation, and then pultruded from a nozzle having an inner diameter of 0.42 mm at a rate of 50 m/min and wound up on a bobbin to obtain a thermoplastic resin-combined glass fiber base material.

EXAMPLE 2

A thermoplastic resin-combined glass fiber base material was obtained in the same manner as in Example 1 except that the inner diameter of the nozzle was changed from 0.42 mm to 0.53 mm.

EXAMPLE 3

A thermoplastic resin-combined glass fiber base material was obtained in the same manner as Example 1 except that the inner diameter of the nozzle was changed from 0.42 mm to 0.75 mm, and the number of filaments in the glass fiber strand was changed to 1,200 filaments.

EXAMPLE 4

Three glass fiber strands (the number of filaments in strand: 600 filaments) which were not subjected to splitting, were bundled, introduced into an acid-modified molten polypropylene (260° C.) with MI=40 and subjected to melt impregnation, and then the bundle was pultruded from a nozzle having an inner diameter of 0.73 mm at a rate of 30 m/min and wound up on a bobbin to obtain a thermoplastic resin-combined glass fiber base material.

EXAMPLE 5

A thermoplastic resin-combined glass fiber base material was obtained in the same manner as in Example 4 except that the pultruding rate from the nozzle was changed to 40 m/min.

COMPARATIVE EXAMPLE 1

A single glass fiber strand (the number of filaments in strand: 100 filaments) which was not subjected to splitting, was introduced into an acid-modified molten polypropylene (260° C.) with MI=40 and subjected to melt impregnation, and then pultruded from a nozzle having an inner diameter of 0.16 mm at a rate of 50 m/min and wound up on a bobbin to obtain a thermoplastic resin-combined glass fiber base material.

COMPARATIVE EXAMPLE 2

A thermoplastic resin-combined glass fiber base material was obtained in the same manner as in Example 1 except that three glass fiber strands (the number of filaments in strand: 200 filaments) which were not subjected to splitting, were bundled.

COMPARATIVE EXAMPLE 3

Three glass fiber strands (the number of filaments in strand: 200 filaments) which were subjected to splitting into three divisions, were bundled, introduced into an acid-modified molten polypropylene (260° C.) with MI=40 and subjected to melt impregnation, and then the bundle was pultruded from a nozzle having an inner diameter of 0.42 mm at a rate of 5 m/min and wound up on a bobbin to obtain a thermoplastic resin-combined glass fiber base material.

COMPARATIVE EXAMPLE 4

A single glass fiber strand (the number of filaments in strand: 600 filaments) which was not subjected to splitting, was introduced into an acid-modified molten polypropylene (260° C.) with MI=40 and subjected to melt impregnation, and then it was attempted to pultrude it from a nozzle having an inner diameter of 0.35 mm at a rate of 10 m/min, but the nozzle was clogged with the glass fibers, whereby the pultrusion was difficult.

COMPARATIVE EXAMPLE 5

A thermoplastic resin-combined glass fiber base material was obtained in the same manner as in Example 4 except that the pultruding rate from the nozzle was changed to 50 m/min.

COMPARATIVE EXAMPLE 6

Three glass fiber strands (the number of filaments in strand: 600 filaments) which were subjected to splitting into three divisions, were bundled, introduced into an acid-modified molten polypropylene (260° C.) with MI=40 and subjected to melt impregnation, and then the bundle was pultruded from a nozzle having an inner diameter of 0.73 mm at a rate of 5 m/min and wound up on a bobbin to obtain a thermoplastic resin-combined glass fiber base material.

COMPARATIVE EXAMPLE 7

16 Glass fiber strands (the number of filaments in strand: 600 filaments) which were not subjected to splitting, were bundled, introduced into an acid-modified molten polypropylene (260° C.) with MI=40 and subjected to melt impregnation, and the bundle was pultruded from a nozzle having an inner diameter of 2.2 mm at a rate of 20 m/min and wound up on a bobbin to obtain a thermoplastic resin-combined glass fiber base material.

COMPARATIVE EXAMPLE 8

16 Glass fiber strands (the number of filaments in strand: 600 filaments) which were not subjected to splitting, were bundled, introduced into an acid-modified molten polypropylene (260° C.) with MI=40 and subjected to melt impregnation, and then it was attempted to pultrude the bundle from a nozzle having an inner diameter of 1.41 mm at a rate of 10 m/min, but the nozzle was clogged with glass fibers, and the pultrusion was difficult.

TABLE 1

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|---|
| Splitting | No | No | No | No | No | No | No | 3 | No | No | 3 | No | No |
| Number of filaments in strand | 600 | 600 | 1200 | 600 | 600 | 100 | 200 | 200 | 600 | 600 | 600 | 600 | 600 |
| Number of strands | 1 | 1 | 1 | 3 | 3 | 1 | 3 | 3 | 1 | 3 | 3 | 16 | 16 |
| Number of packages | 96 | 96 | 96 | 96 | 96 | 96 | 96 | 96 | 96 | 96 | 96 | 96 | 96 |
| Number of nozzles (Number of pultruded samples) | 96 | 96 | 96 | 32 | 32 | 96 | 32 | 96 | 96 | 32 | 96 | 6 | 6 |
| Average diameter of material (mm) | 0.42 | 0.53 | 0.75 | 0.73 | 0.73 | 0.16 | 0.42 | 0.42 | 0.35 | 0.73 | 0.73 | 2.2 | 1.41 |
| Pultruding rate (m/min) | 50 | 50 | 50 | 30 | 40 | 50 | 50 | 5 | Not pultruded | 50 | 5 | 20 | Not pultruded |
| Glass content (vol %) | 67 | 46 | 46 | 67 | 67 | 67 | 67 | 67 | (82) Supposition | 67 | 67 | 45.5 | (82) Supposition |
| Impregnation rate (%) | 100 | 100 | 100 | 100 | 95 | 100 | 90 | 90 | — | 90 | 90 | 98 | — |
| R (mm) | 6 | 5 | 8 | 13 | 13.5 | 2.5 | 9 | 10 | — | 15 | 16 | 35 | — |
| 30DV | 8.4 | 7.3 | 10.4 | 14.7 | 14.7 | 3.2 | 8.4 | 8.4 | — | 14.7 | 14.7 | 30 | — |
| 30DVI$^2$ | 8.4 | 7.3 | 10.4 | 14.7 | 13.3 | 3.2 | 7.6 | 7.6 | — | 11.9 | 11.9 | 28.8 | — |
| Flexibility | ◎ | ◎ | ◎ | ◎ | ○ | ◎ | X | X | — | X | X | X | — |
| Tensile breaking load (kgf) | 24 | 25 | 50 | 72 | 70 | 4 | 20 | 18 | — | 65 | 62 | 380 | — |

TABLE 1-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|---|---|
| Number failed in pultrusion (filaments/hr) | 0 | 0 | 0 | 2 | 4 | 0 | 11 | 48 | — | 11 | 48 | 1 | — |
| Productivity (kg/hr) | 76 | 92 | 184 | 44 | 56 | 15 | 17 | 4 | — | 50 | 10 | 75 | — |

The average diameter, the impregnation rate and the radius of curvature are, respectively, averages of n = 5.
Flexibility: ① $R \leq 30DV$, ② $R \leq 30DVI^2$, ⊚: satisfies ① and ②, ○: satisfies ①, X: does not satisfy ① and ②

From the results in Table 1, it is evident that the thermoplastic resin-combined glass fiber base materials of the present invention (Examples 1 to 5) are excellent in flexibility and have good pultrusion properties, productivity and mechanical strength. Especially, it is evident that the thermoplastic resin-combined glass fiber base materials of Examples 1 to 3 are excellent in flexibility and have good pultrusion properties and productivity.

On the other hand, it is evident that the thermoplastic resin-combined glass fiber base material of Comparative Example 1 having a smaller average diameter is inferior in the mechanical strength and productivity, and the thermoplastic resin-combined glass fiber base material of Comparative Example 7 having a larger average diameter is poor in the flexibility.

Further, it is evident that the thermoplastic resin-combined glass fiber base materials of Comparative Examples 2, 3, 5 and 6 having low impregnation rates, are poor in the flexibility and pultrusion properties.

Further, in Comparative Examples 4 and 8 wherein the glass content was too high, the nozzle tended to clog, and the production was difficult.

As described in the foregoing, the thermoplastic resin-combined glass fiber base material of the present invention is capable of increasing the glass content, while it has excellent flexibility and good pultruding property and productivity, and it is excellent in the mechanical strength such as the tensile breaking load. Further, since the thermoplastic resin is adequately impregnated to the glass fibers, it is possible to carry out quick molding under low pressure.

Accordingly, it is useful, for example, as a prepreg for molding of a woven fabric or cord fabric, and a prepreg molded by means of the thermoplastic resin-combined glass fiber base material of the present invention, is useful as a reinforcing material for buildings or construction in the form of a unidirectional reinforced sheet or biaxially or polyaxially reinforced sheet, and it may be subjected to drawing to form e.g. a box.

Further, the thermoplastic resin-combined glass fiber base material of the present invention is useful as a filament winding material or a reinforcing fiber base material for concrete. Furthermore, by cutting the material, it is useful for LFC for e.g. injection molding, which provides good productivity with less fuzzing.

What is claimed is:

1. A thermoplastic resin-combined glass fiber base material, which comprises a glass fiber strand having a plurality of glass monofilaments bundled and a thermoplastic resin impregnated thereto, and which:

A) has a string form with an average diameter of from 0.2 to 1.5 mm,
B) has a glass content of from 15 to 80 vol %,
C) has an impregnation rate of the thermoplastic resin of at least 95%, and
D) satisfies $R \leq =30D \times V$, where R is the radius of curvature (mm) representing the buckling limit in bending, D is the average diameter (mm), and V is the glass content (vol %/100).

2. The thermoplastic resin-combined glass fiber base material according to claim 1, wherein the glass fiber strand is a glass fiber strand obtained by bundling the plurality of glass monofilaments without applying splitting thereto.

3. The thermoplastic resin-combined glass fiber base material according to claim 2, which comprises one glass fiber strand and the thermoplastic resin impregnated thereto.

4. The thermoplastic resin-combined glass fiber base material according to claim 1, which satisfies $R \leq 30D \times V \times I^2$, where R is the radius of curvature (mm) representing the buckling limit in bending, D is the average diameter (mm), V is the glass content (vol %/100), and I is the impregnation rate (%/100).

5. The thermoplastic resin-combined glass fiber base material according to claim 1, which has a glass content of from 25 to 70 vol %.

6. The thermoplastic resin-combined glass fiber base material according to claim 1, wherein the glass fiber strand has from 200 to 2,000 glass monofilaments bundled.

7. A process for producing a thermoplastic resin-combined glass fiber base material, which comprises impregnating a thermoplastic resin by a melt impregnation method to a glass fiber strand obtained by bundling a plurality of glass monofilaments without applying splitting thereto, followed by pultrusion from a nozzle and winding up, to obtain a thermoplastic resin-combined glass fiber base material which comprises a glass fiber strand having a plurality of glass monofilaments bundled and a thermoplastic resin impregnated thereto, and which:

A) has a string form with an average diameter of from 0.2 to 1.5 mm,
B) has a glass content of from 15 to 80 vol %,
C) has an impregnation rate of the thermoplastic resin of at least 95%, and
D) satisfies $R \leq 30D \times V$, where R is the radius of curvature (mm) representing the buckling limit in bending, D is the average diameter (mm), and V is the glass content (vol %/100).

* * * * *